(12) United States Patent
Achour et al.

(10) Patent No.: US 11,050,162 B2
(45) Date of Patent: Jun. 29, 2021

(54) METHOD AND APPARATUS FOR OBJECT DETECTION WITH INTEGRATED ENVIRONMENTAL INFORMATION

(71) Applicant: Metawave Corporation, Palo Alto, CA (US)

(72) Inventors: Maha Achour, Palo Alto, CA (US); George Daniel, Palo Alto, CA (US)

(*) Notice: Subject to any disclaimer, the term of this patent is extended or adjusted under 35 U.S.C. 154(b) by 226 days.

(21) Appl. No.: 16/208,496

(22) Filed: Dec. 3, 2018

(65) Prior Publication Data

US 2019/0173196 A1 Jun. 6, 2019

Related U.S. Application Data

(60) Provisional application No. 62/593,921, filed on Dec. 2, 2017.

(51) Int. Cl.
| | | |
|---|---|---|
| *H01Q 3/00* | (2006.01) | |
| *H01Q 21/00* | (2006.01) | |
| *H01Q 1/28* | (2006.01) | |
| *G05D 1/00* | (2006.01) | |
| *G01S 13/86* | (2006.01) | |

(Continued)

(52) U.S. Cl.
CPC ......... *H01Q 21/0025* (2013.01); *G01S 7/412* (2013.01); *G01S 13/02* (2013.01); *G01S 13/426* (2013.01); *G01S 13/865* (2013.01); *G01S 13/867* (2013.01); *G01S 13/931* (2013.01); *G01S 13/935* (2020.01); *G05D 1/0088* (2013.01); *H01Q 1/28* (2013.01); *H01Q 3/00* (2013.01); *G01S 7/417* (2013.01); *G01S 2013/0263* (2013.01);

(Continued)

(58) Field of Classification Search
CPC .. H01Q 21/0025; H01Q 1/28; H01Q 15/0086; G01S 13/935; G01S 7/412; G01S 13/931; G01S 13/426; G01S 13/02; G01S 13/867; G01S 13/865; G01S 2013/932; G01S 2013/9322; G01S 2013/0263; G01S 7/417; G05D 1/0088; G05D 2201/0213
See application file for complete search history.

(56) References Cited

U.S. PATENT DOCUMENTS

| 6,492,949 B1 | 12/2002 | Breglia et al. |
|---|---|---|
| 2005/0134440 A1* | 6/2005 | Breed .................. G01S 17/89 340/435 |

(Continued)

OTHER PUBLICATIONS

S. Jovanoska, et al., "Multisensor data fusion for UAV detection and localization," European Microwave Week, EuMC/EuRAD, slides 1-26, Nuremberg, Germany, Oct. 2017.

(Continued)

*Primary Examiner* — Genna M Mott
(74) *Attorney, Agent, or Firm* — Sandra Lynn Godsey

(57) ABSTRACT

Examples disclosed herein relate to a sensor fusion system for use in an autonomous vehicle. The sensor fusion system has a radar detection unit with a metastructure antenna to direct a beamform in a field-of-view ("FoV") of the vehicle, an analysis module to receive information about a detected object and determine control actions for the radar detection unit and the metastructure antenna based on the received information and on environmental information, and an autonomous control unit to control actions of the vehicle based on the received information and the environmental information.

20 Claims, 15 Drawing Sheets

(51) Int. Cl.
G01S 7/41 (2006.01)
G01S 13/931 (2020.01)
G01S 13/42 (2006.01)
G01S 13/02 (2006.01)
G01S 13/935 (2020.01)

(52) U.S. Cl.
CPC . *G01S 2013/932* (2020.01); *G01S 2013/9322* (2020.01); *G05D 2201/0213* (2013.01)

(56) References Cited

U.S. PATENT DOCUMENTS

| | | | | |
|---|---|---|---|---|
| 2006/0232468 | A1* | 10/2006 | Parker | H01Q 1/241 |
| | | | | 342/359 |
| 2012/0064841 | A1* | 3/2012 | Husted | H01Q 3/2605 |
| | | | | 455/78 |
| 2016/0003938 | A1* | 1/2016 | Gazit | G01S 13/02 |
| | | | | 342/81 |
| 2016/0011307 | A1* | 1/2016 | Casse | G01S 13/931 |
| | | | | 701/93 |
| 2016/0061935 | A1 | 3/2016 | McCloskey et al. | |
| 2016/0131753 | A1* | 5/2016 | Brown | G01S 13/10 |
| | | | | 342/128 |
| 2018/0259972 | A1* | 9/2018 | Heo | G05D 1/0248 |
| 2019/0036213 | A1* | 1/2019 | Russell | H01Q 1/1257 |

OTHER PUBLICATIONS

A. Polychronopoulos et al., "Data fusion in multi sensor platforms for wide-area perception," 2006 IEEE Intelligent Vehicles Symposium, Tokyo, Japan, pp. 412-417, Jun. 2006.

N. Floudas et al., "Multi-Sensor Coordination and Fusion for Automotive Safety Applications," 2006 9th International Conference on Information Fusion, Florence, Italy, pp. 1-8, Jul. 2006.

L. Danielsson, "Tracking and radar sensor modelling for automotive safety systems," Doctoral thesis, Department of Signals and Systems, Chalmers University of Technology Goeteborg, Sweden, pp. 1-120, 2010.

F. B. Ramian, "Automotive Radar Imaging Using Noncoherent Sensors," Doktor—Ingenierus Dissertation, Technische Universität München, Sep. 2005.

F. Bu et al,. "Pedestrian detection in transit bus application: sensing technologies and safety solutions," IEEE Proceedings. Intelligent Vehicles Symposium, Las Vegas, NV, USA, pp. 100-105, Jun. 2005.

S. Alvarez et al. "Perception advances in outdoor vehicle detection for automatic cruise control," Robotica, Cambridge University Press, pp. 765-779, Jul. 2009.

S. Carpenter, "Autonomous Vehicle Radar: Improving Radar Performance with Simulation," White Paper, High Frequency/Electronics Business Unit, ANSYS, Canonsburg, PA, pp. 1-14, 2017.

S. Milch et al., "Pedestrian Detection with Radar and Computer Vision," Smart Microwave Sensors GmbH, Braunschweig, Germany, pp. 1-7, 2001.

R. O. Chavez-Garcia et al., "Fusion framework for moving-object classification," Proceedings of the 16th International Conference on Information Fusion, Istanbul, Turkey, pp. 1159-1166, Jul. 2013.

M. Bertozzi et al., "Obstacle detection and classification fusing radar and vision," 2008 IEEE Intelligent Vehicles Symposium, Eindhoven, The Netherlands, pp. 608-613, Jun. 2008.

D. Langer, "An Integrated MMW Radar System for Outdoor Navigation," Ph.D. dissertation, The Robotics Institute, Carnegie Mellon University, Pittsburgh, PA, pp. 1-116, Jan. 1997.

J. Leonard, et al., "A Perception-Driven Autonomous Urban Vehicle," Journal of Field Robotics, 1-48, p. 1-48, 2008.

M. Tons et al.,"Radar sensors and sensor platform used for pedestrian protection in the EC-funded project SAVE-U," IEEE Intelligent Vehicles Symposium, 2004, Parma, Italy, pp. 813-818, Jun. 2004.

T. Wang et al., "Integrating millimeter wave radar with a monocular vision sensor for on-road obstacle detection applications," Sensors, Basel, Switzerland, vol. 11(9), pp. 8992-9008, Sep. 2011.

* cited by examiner

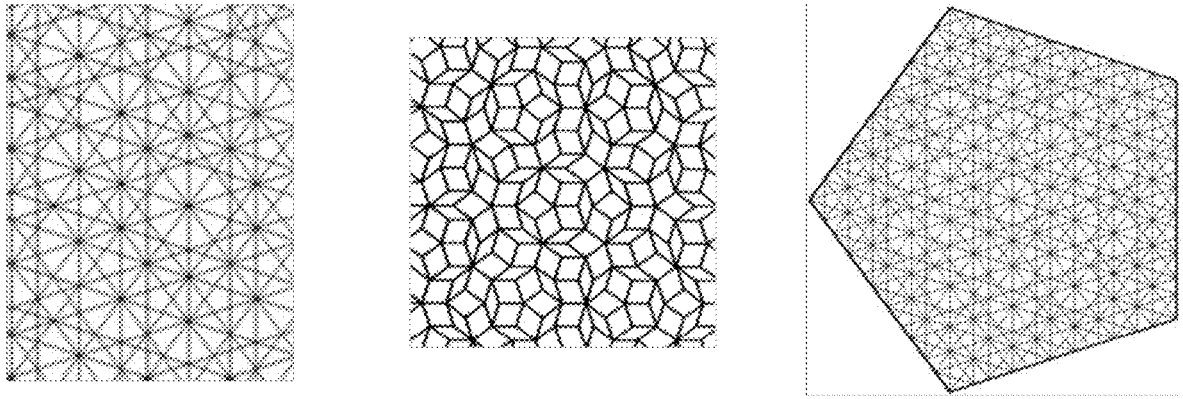
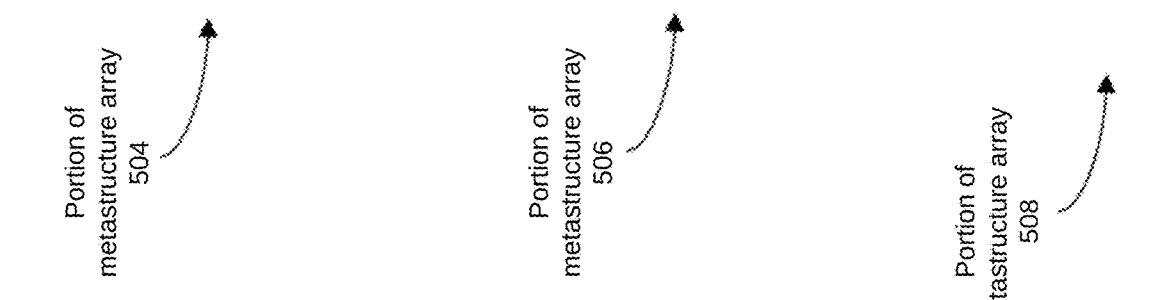
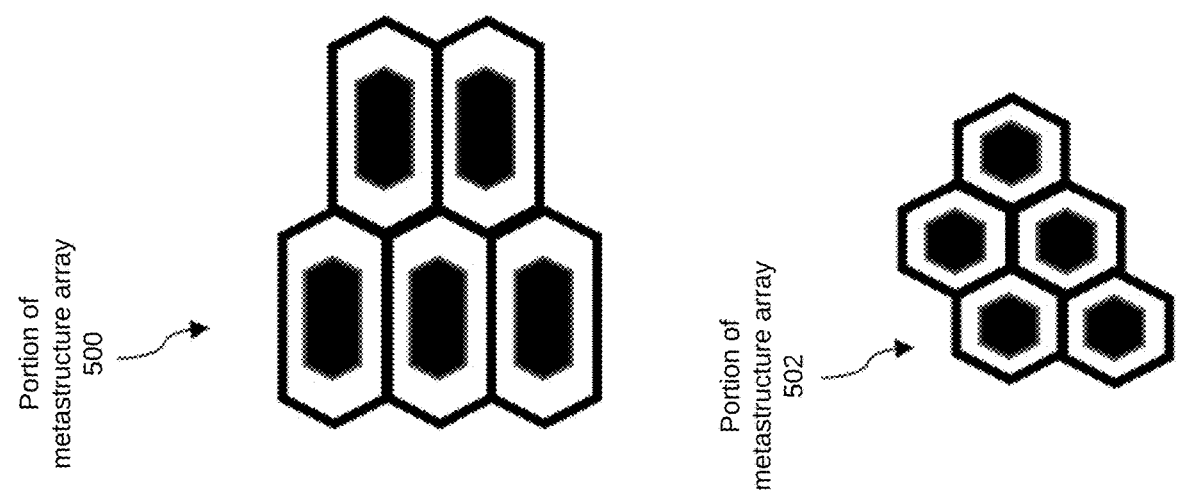
FIG. 5

METHOD AND APPARATUS FOR OBJECT DETECTION WITH INTEGRATED ENVIRONMENTAL INFORMATION

CROSS-REFERENCE TO RELATED APPLICATIONS

This application claims priority to U.S. Provisional Application No. 62/593,921, filed on Dec. 2, 2017, and incorporated herein by reference.

BACKGROUND

Antennas are used in everyday life for communication systems, sensing devices, radar systems and so forth. Recently there is attention given to autonomous, or self-driving, vehicles. The designs and products contemplated today do not consider all the weather conditions, power consumption constraints and timing required for effective control of a vehicle. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. Autonomous vehicles will need a sensing system that works over the range of road, weather, temperature, visibility, traffic conditions and so forth, while maintaining consistent reliable service.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIGS. 4-5 illustrate metastructure cell configurations in accordance with various examples;

DETAILED DESCRIPTION

Methods and apparatuses for object detection with integrated environmental information are disclosed. Object detection is accomplished with various sensors that are controlled to respond to environmental information. In various examples, a sensor fusion module receives information from multiple sensors, including a radar sensor having a metastructure antenna. The metastructure antenna is dynamically controlled such as to change its electrical or electromagnetic configuration to enable object detection in different environmental conditions.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
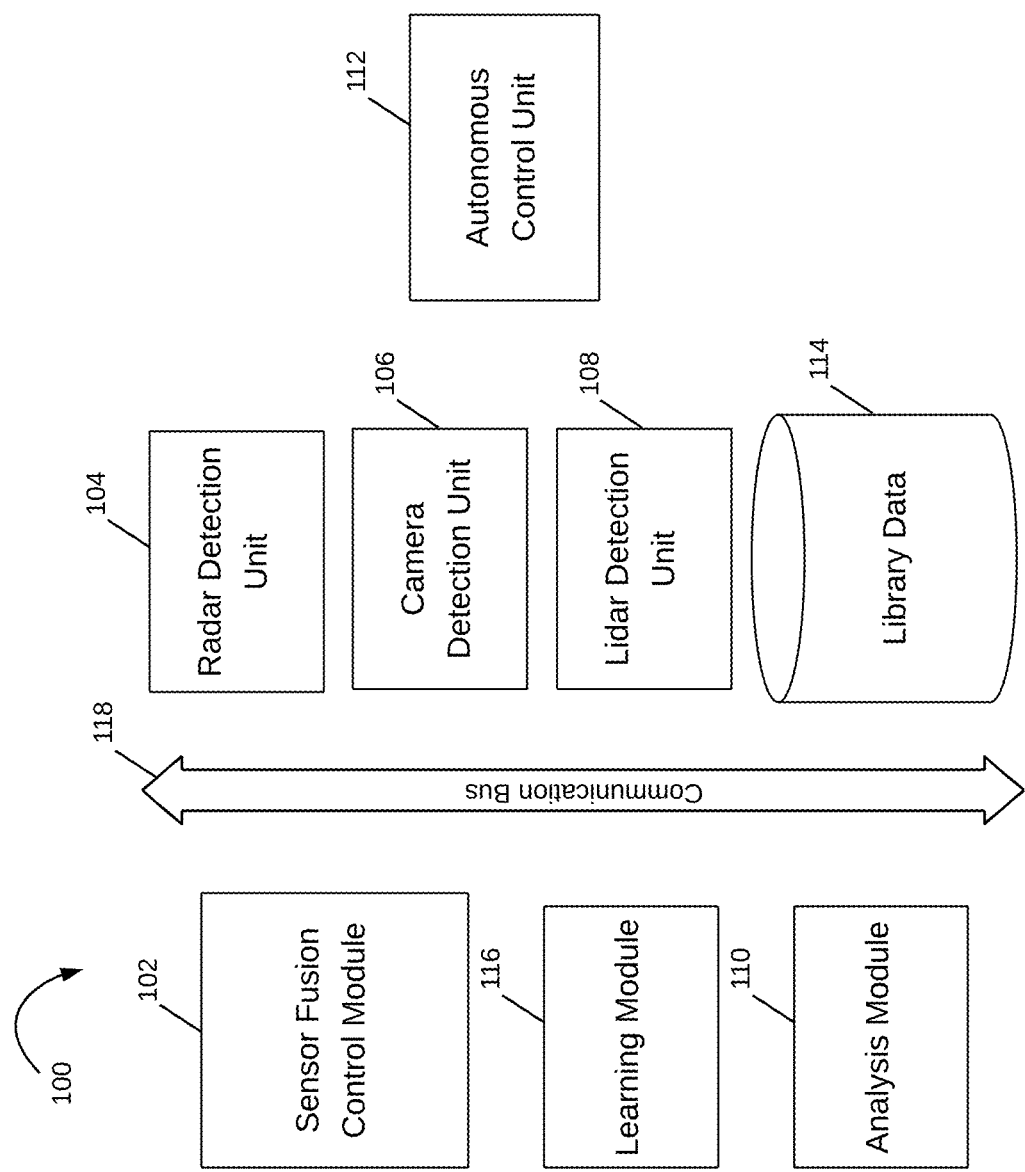
FIG. 1 is a schematic diagram of a sensor fusion system for an autonomous vehicle in accordance with various examples.

FIG. 1 is a schematic diagram of a sensor fusion system for an autonomous vehicle in accordance with various examples. Sensor fusion system 100 is a system in an autonomous vehicle (not shown) for managing the information flow from/to the various sensors in the vehicle, initiating and controlling their operation and generally acting in accordance with rules that relate sensor information to other vehicular controls. Sensors in the vehicle include radar detection unit 104, camera detection unit 106, and lidar detection unit 108. Radar detection unit 104 includes a metastructure antenna described in more detail below capable of changing its electrical and electromagnetic configuration to enable object detection in different environmental conditions. In one example, the metastructure antenna may perform a coarse scan with a large beam width as an ambient condition, and then narrow the beam width when an echo is received, indicating an object is within the field-of-view ("FoV") of the vehicle. The beam width may be adjusted depending on environmental conditions, e.g., whether in a rural or congested area, whether in a storm or clear day, and so forth. In this way, the vehicle is continuously scanning its FoV.

Consider a scenario in which the vehicle is driving across a bridge. The radar detection unit 104 may first generate a coarse and omnidirectional beamform which implements a wide beamform scan across the vehicle's FoV. This omnidirectional beamform enables the vehicle to detect a wide area, such as while no objects are detected. In situations where the vehicle is moving at a high speed and needs to quickly evaluate the immediate environment, the omnidirectional beam may detect objects far ahead. At a high speed, the immediate environment is much larger than at lower speeds. For a vehicle moving at 30 mph, the immediate environment may be 40 feet in the path of the vehicle. For a vehicle moving at 60 mph, the immediate environment may be 300 meters out to enable action when an object is detected. As described in more detail below, the metastructure antenna in radar detection unit 104 is able to change the generated beamform to a pencil beam scan having a narrow width beamform. After an object is detected, such as with a wider beamform, this narrow beam control enables more specific object identification. Object identification is a challenge that is solved using information from radar detection unit 104 but also camera or laser technology from camera detection unit 106 and lidar detection unit 108, both of which require digital processing and incur processing latency.

Camera detection unit 106 may be used to detect visible objects and conditions and to assist in the performance of various functions in the vehicle. The lidar detection unit 108 can also be used to detect objects and provide this information to adjust control of the vehicle. This information may include information such as congestion on a highway, road conditions, and other conditions that would impact the sensors, actions or operations of the vehicle. Camera sensors are currently used in ADAS systems to assist drivers in driving functions such as parking (e.g., in rear view cameras). Cameras are able to capture texture, color and contrast information at a high level of detail, but similar to the human eye, they are susceptible to adverse weather conditions and variations in lighting. Lidar sensors measure the distance to an object by calculating the time taken by a pulse of light to travel to an object and back to the sensor. When positioned on top of a vehicle, lidars are able to provide a 360° 3D view of the surrounding environment. However, lidar sensors are still prohibitively expensive, bulky in size, sensitive to weather conditions and are limited to short ranges (typically <200 m), with resolution decreasing with range. Radars, on the other hand, have been used in vehicles for many years and operate in all-weather conditions. Radars also use far less processing than the other types of sensors and have the advantage of detecting objects behind obstacles and determining the speed of moving objects.

Object detection information from radar detection unit 104, camera detection unit 106 and lidar detection unit 108 is provided to analysis module 110. In one example, analysis module 110 applies rules based on the received information, such as rules for confirming whether an object is detected and rules for performing actions based on the object detection. These actions may include sensor fusion control module 102 directing the radar detection unit 104 to narrow a beam and direct it toward the potential object, or directing the camera detection unit 106 and the lidar detection unit 108 to capture images in a specific direction. Analysis module 110 may also direct autonomous control unit 112 to control other aspects of the vehicle, e.g., breaking, changing lanes, etc., as needed based on the object detection information. Object detection information and rules may be stored in library data 114. Library data 114 may also store topographical or other environmental information that may aid in the detection of objects.

In some examples, the analysis module 110 is a neural network that receives sets of data to predict a condition. The sets of data may include the amplitude of a received signal, an angle of arrival, and/or other information received from the radar detection unit 104 or other components of the sensor fusion system 100. The neural network is a learning mechanism that may continue to change and improve with operation of the system 100. Learning module 116 stores training data for training the neural network in analysis module 110, receives information from the various sensors (e.g., detection units 104-108) and control modules within the sensor fusion system 100 and the vehicle to improve the neural network performance and accuracy. The detection units 104-108 and other modules within the sensor fusion system 100 communicate via communication bus 118. Alternate examples may implement a variety of other types of analysis mechanisms and include additional modules not shown in FIG. 1.

Figure 2:
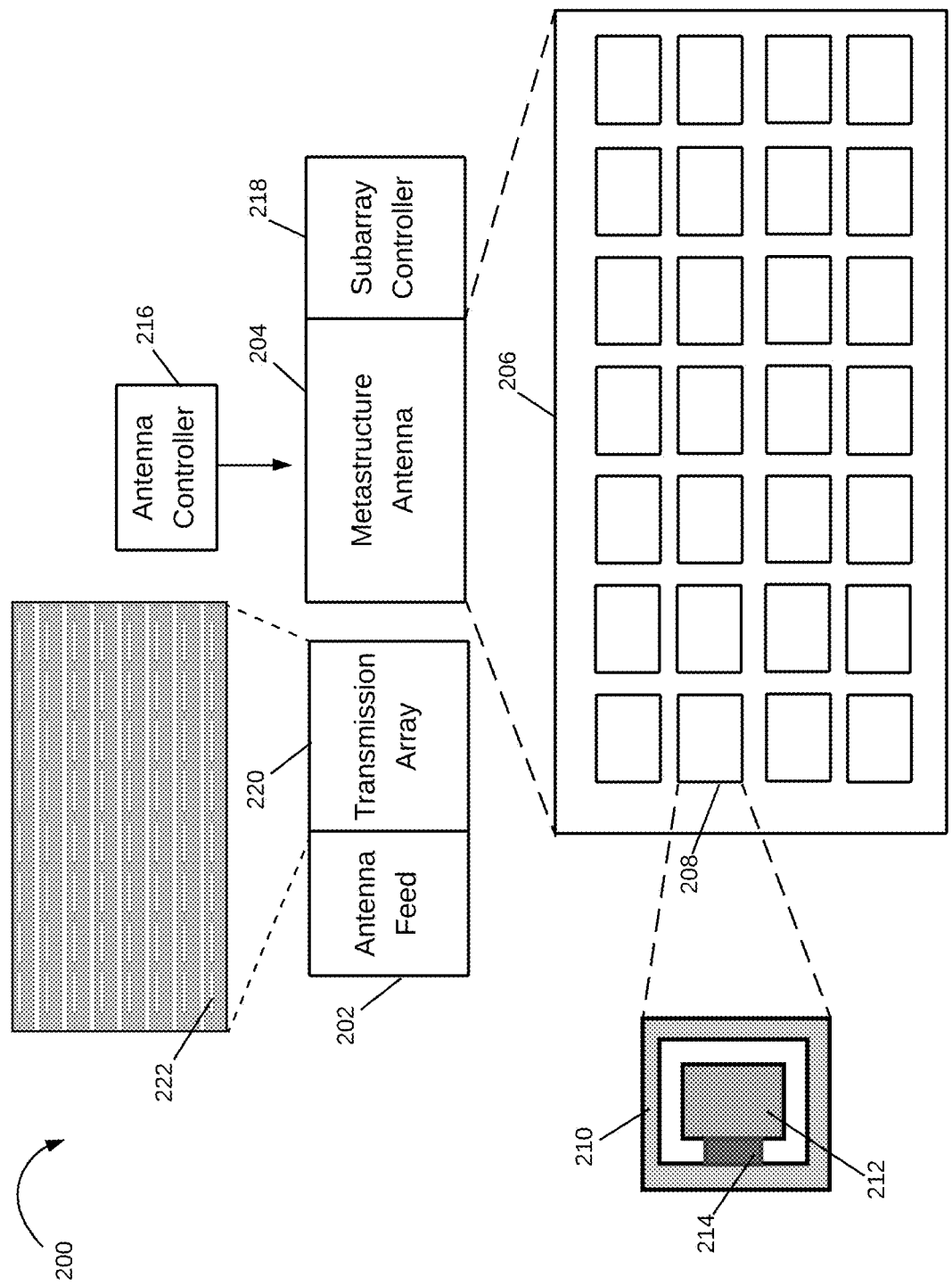
FIG. 2 is a schematic diagram of a radar detection unit for use in a sensor fusion system as in FIG. 1, in accordance with various examples.

A radar detection unit for use in a sensor system as in FIG. 1 is illustrated in FIG. 2 in accordance with various examples. Radar detection unit 200 has an antenna feed 202, a transmission array 220 and a metastructure antenna 204, which form a metastructure antenna system. Metastructure antenna 204 has an array of radiating elements or cells 206. As illustrated, the cells 206 are uniform structures. Alternate examples may be configured to include different size and/or shape cells. In one example, each cell 206 is designed to operate in the right-handed mode positive index of refraction with phase engineering on the spatial domain to achieve the desired transmission characteristics. In another example, each cell 206 may be a metamaterial ("MTM") cell. An MTM cell is an artificially structured element used to control and manipulate physical phenomena, such as the electromagnetic properties of a signal including its amplitude, phase, and wavelength. Metamaterial cells behave as derived from inherent properties of their constituent materials, as well as from the geometrical arrangement of these materials with size and spacing that are much smaller relative to the scale of spatial variation of typical applications.

A metamaterial is a geometric design of a material, such as a conductor, wherein the shape creates a unique behavior for the device. An MTM cell may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional degrees of freedom determines the characteristics of a cell, wherein a cell having a number of edges and discontinuities may model a specific-type of electrical circuit and behave in a given manner. In this way, an MTM cell radiates according to its configuration. Changes to the reactance parameters of the MTM cell result in changes to its radiation pattern. Where the radiation pattern is changed to achieve a phase change or phase shift, the resultant structure is a powerful antenna, as small changes to the MTM cell can result in large changes to the beamform. The array of cells 206 is configured so as to form a beamform or multiple beamforms involving subarrays of the cells or the entire array.

The cells 206 may include a variety of conductive structures and patterns, such that a received transmission signal is radiated therefrom. In some examples, each cell 206 may have unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial.

In some examples, at least one of the cells 206 is coupled to a reactance control mechanism such as a varactor to change the reactance and/or other parameters of the cell. An example of such a cell is illustrated as cell 208. Cell 208 has a conductive outer portion or loop 210 surrounding a conductive area 212 with a space in between. Each cell 206 may be configured on a dielectric layer, with the conductive areas and loops provided around and between different cells. A voltage controlled variable reactance device 214, e.g., a varactor, provides a controlled reactance between the conductive area 212 and the conductive loop 210. By altering the reactance of cells 206, signals radiated from metastructure antenna 204 are formed into beams having a beam width and direction as determined by such control. The individual metastructure cells 206 may be arranged into sub arrays that enable multiple beamforms in multiple directions concurrently.

In various examples, antenna controller 216 acts to control the operational parameters of the metastructure antenna 204, such as, for example, voltages to be applied to individual cells 206. The antenna controller 216 includes modules and components that capture, measure, store, analyze and provide instructions to the metastructure 204. The extent of the capabilities of the antenna controller 216 is strong and flexible; as more and more information is required for an application, the antenna controller 216 can build additional capabilities. For example, historically a driver will slow down dramatically in thick fog, as the driving speed decreases with decreases in visibility. On a highway in Europe, for example, where the speed limit is 115 km/hr, a driver may need to slow down to 40 km/hr when visibility is poor. Using the radar detection unit 200, the driver (or autonomous vehicle) may maintain the maximum safe speed without regard to the weather conditions. Even if other drivers slow down, the autonomous vehicle with radar detection unit 200 will be able to detect those slow-moving cars and obstacles in the way and avoid/navigate around them.

Additionally, in highly congested areas, it is necessary for an autonomous vehicle to detect objects in sufficient time to react and take action. The radar detection unit 200 increases the sweep time of a radar signal so as to detect any echoes in time to react. In rural areas and other areas with few obstacles during travel, the antenna controller 216 adjusts the focus of the beam to a larger beam width by controlling the voltages applied to the cells 206, thereby enabling a faster scan of areas where there are few echoes. The antenna controller 216 may detect this situation by evaluating the number of echoes received within a given time period, and making beam size adjustments accordingly. Once an object is detected, the antenna controller 216 determines how to adjust the beam focus. This is achieved by changing the specific configurations and conditions of the metastructure antenna 204.

In one example scenario, a subset of cells 206 are configured as a subarray, that is, the subarray is treated as a single unit. Subarray controller 218 acts to control individual subarrays of metastructure antenna 204, such as by providing bias voltages to the varactors in the cells of each subarray according to the desired directions for the each beamform. Each subarray may receive a different bias voltage, thereby enabling the radar detection unit 200 to provide multiple directional beamforms to cover an entire FoV. All of these detection scenarios, analysis and reactions may be stored in the analysis module 110, the learning module 116 and the library data 114 of FIG. 1. These may then be used for later analysis or simplified reactions. For example, if there is an increase in the echoes received at a given time of day or on a specific highway, that information is fed into the antenna controller 216 to assist in proactive preparation and configuration of the metastructure antenna 204. Additionally, there may be some subarray combinations that perform better, such as to achieve a desired result, and this is stored in the library data 114.

In operation, the metastructure antenna 204 provides radar radiation pattern(s) to scan the FoV of the vehicle. In some examples, an FoV composite data unit may be used to store information that describes the FoV. This may be historical data used to track trends and anticipate behaviors and traffic conditions, or may be instantaneous or real time data that describes the FoV at a moment in time or over a window in time. The ability to store this data enables the antenna controller 216 to make decisions that are strategically targeted at a particular point or area within the FoV. For example, the FoV may be clear (no echoes received) for five minutes, and then one echo arrives from a specific region in the FoV; this is similar to detecting the front of a car. In response, the antenna controller 216 may determine to narrow the beam width for a more focused view of that sector or area in the FoV. The next scan may indicate the length or other dimension of an object, and if the object is a car, the antenna controller 216 may consider what direction the object is moving and focus the beams on that area. Similarly, the echo may be from a spurious object, such as a bird, which is small and moving quickly out of the path of the car. There are a variety of other uses for the FoV composite data, including the ability to identify a specific type of object based on previous detection.

The analysis module 110 receives control information from the antenna controller 216, and determines the adjustments, if any, to be made. In some examples, the scan begins with a coarse scan having a large band width. On object detection, the beam width narrows. The sensor fusion system 100 responds to radar detection unit 104 and may vary the beam width as quickly or slowly as desired. In some examples, the beam width is a binary value, and in others it may take on continuous values. The radar detection unit 104 instructs the antenna controller 216 where to direct the beam, such as from a subarray. From the received information (echoes) the radar detection unit 104 and the analysis module 110 determine parameters and dimensions of the detected object.

The antenna controller 216 also controls the transmit and receive paths to and from metastructure antenna 204. There may a portion of the metastructure cells 206 that are dedicated to receive and another portion dedicated to transmit, the metastructure antenna 204 may be a transmit and receive antenna, or the radar detection unit 204 may have multiple metastructure antennas, with some dedicated to transmit beamforms and others dedicated to receive echoes from objects reached by the transmitted beamforms. In some examples, the antenna controller 216 may allocate specific metastructure cells, or subarrays, as receive only, transmit only or as transmit and receive. There may be any number of combinations and designs for these examples.

As illustrated, the metastructure antenna 204 is fed a transmission signal from antenna feed structure 202. The antenna feed structure 202 in some examples includes an input port to receive a transmission signal, and provides that signal to transmission array 220. A power divider circuit (not shown) distributes the received transmission signal to a plurality of transmission lines. In this example, each transmission line has a number of slots (e.g., slot 222) formed therein such that the number of slots corresponds to the number of metastructure cells 206. In other examples, the number of slots is a function of the metastructure antenna 204, such as where one slot may be associated with multiple metastructure cells 206. The antenna controller 216 controls the propagation of a transmission signal through the transmission array 220, and controls the metastructure cells 206. Control of the reactance of each metastructure cell 206 enables the antenna controller 216 to modify the beamform from each individual cell, wherein the combination of beamforms results in a directed beamform. The cells 206 may be treated as subarrays that allow multiple directed beams.

Figure 3:
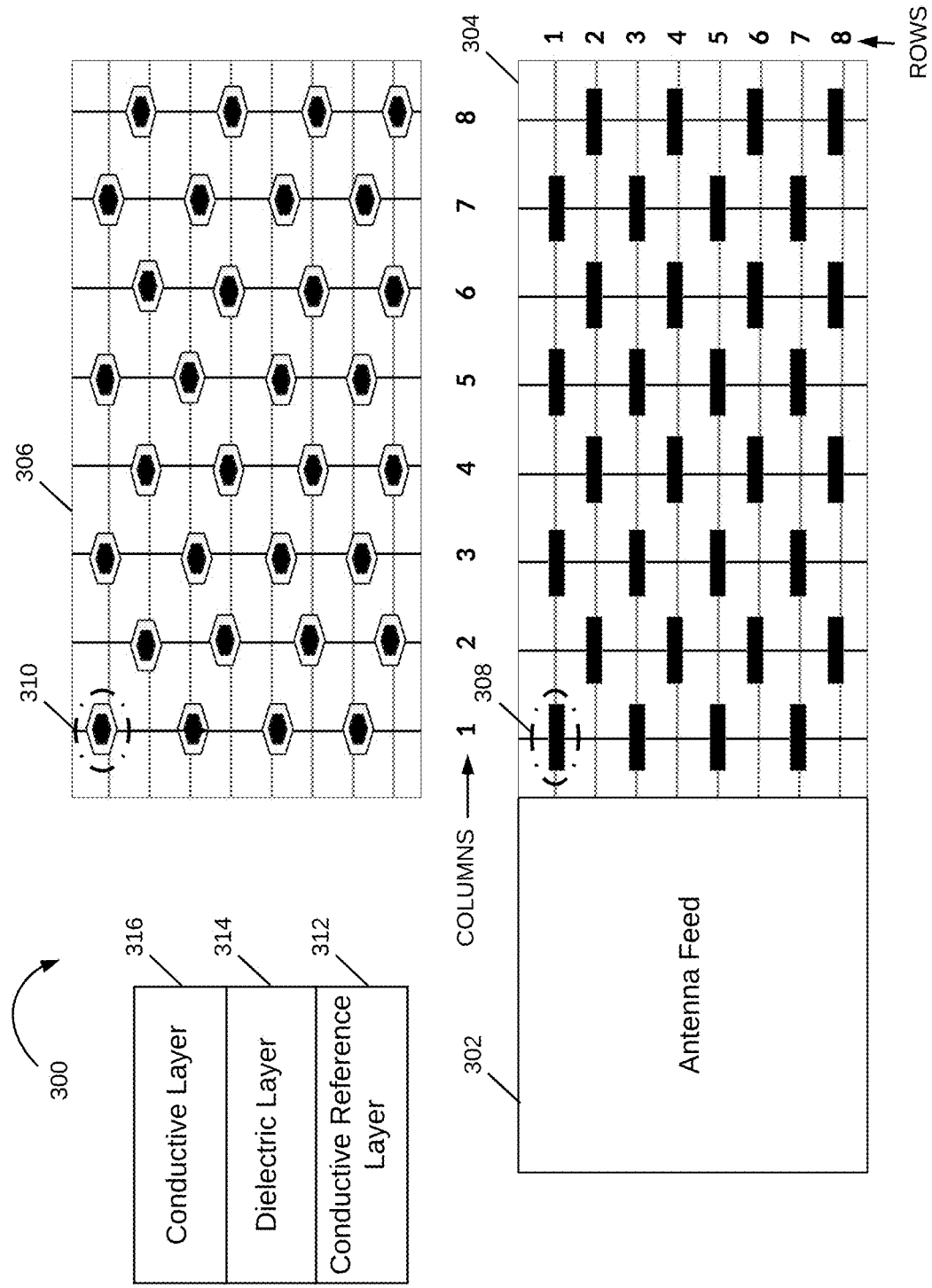
FIG. 3 is a schematic diagram of a metastructure antenna system, in accordance with various examples.

FIG. 3 is a schematic diagram of a metastructure antenna system, in accordance with various examples. Metastructure antenna system 300 has antenna feed 302, transmission array 304 and metastructure antenna 306 arranged in rows and columns, wherein the feed 302 supplies the transmission signal to the rows of transmission array 304. Each row of the transmission array structure 304 correlates to a transmission path, and has a plurality of discontinuities configured therein. The discontinuities in the present examples are slots in the conductive surface that is formed on a dielectric substrate. The slot, e.g., slot 308, are positioned within each row. The placement of each slot may be evenly distributed or may be positioned to achieve a specific beamform. The slots provide the transmission signal to the metastructure cells in the metsastructure antenna 306, e.g., metastructure cell 310. The example of FIG. 3 is provided for clarity of understanding, and the present disclosure is not limited to the specific configuration of elements or the specific elements described, including the slots in transmission array 304 and metastructure cells in metastructure antenna 306.

In this example, each slot corresponds to a metastructure cell, e.g., slot 308 corresponds to metastructure cell 310. This relationship controls the signal received at each metastructure cell, which radiates the transmission signal into a beamform. The size, shape, amplitude, direction and other parameters of the beamform may be adjusted by way of reactance control of each metastructure cell as well as control of the transmission signal as provided from feed 302 to the transmission array structure 304.

Also illustrated in FIG. 3 is a cross-sectional view of a portion of a radar detection unit, having conductive layers 312 and 316, and having a dielectric layer 314 sandwiched therebetween. Note that there may be any number of additional layers in alternate examples. The configuration may be constructed by providing conductive traces to form the metastructure cells in metastructure antenna 306, e.g., metastructure cell 310, on the dielectric layer 314, vias configured to couple the conductive layers 312 and 316, and elements that couple each metastructure cell to a reactance control device such as a varactor.

Figure 4:
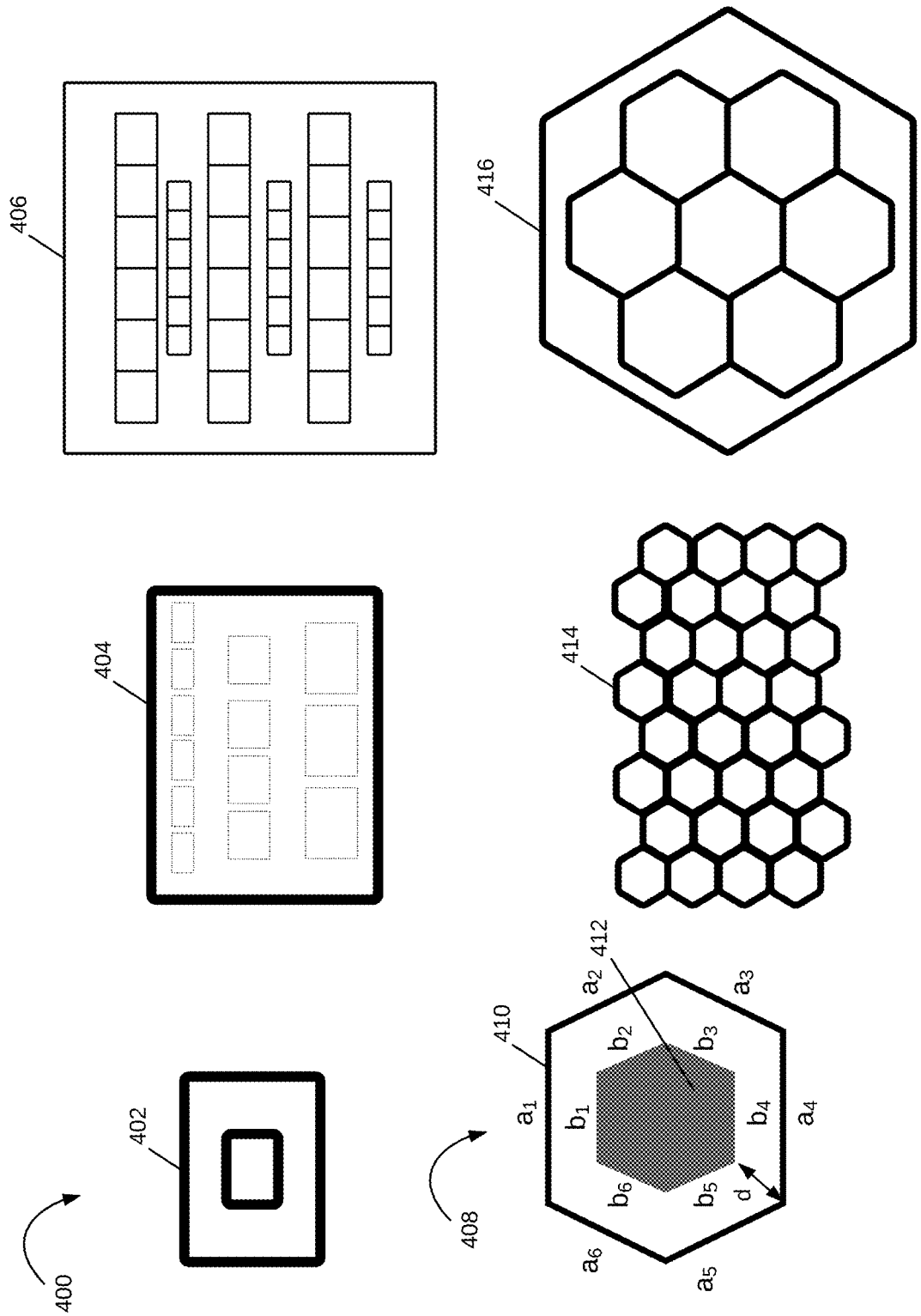

FIGS. 4-5 illustrate example configurations for metastructure cells that may be used in the metastructure antenna 306. In FIG. 4, the metastructure cells are organized into rows, wherein the specific configuration may be designed to achieve application considerations. Cell 402 in FIG. 4 may be an MTM cell, a patch cell with a surrounding loop, or another such structure that when in an array of cells constitutes a metastructure array as in metastructure array 406. The array of cells 402 may be an array having rows of cells of different sizes, as in arrays 404-406.

In another example, each cell may have an hexagonal shape as in cell 408 to provide design flexibility for a densely packed array. Each cell 408 has an outer geometric shape, referred to herein as a hexagonal conductive loop, e.g., loop 410, and an inner geometric shape that is referred to as a hexagonal conductive patch, e.g., patch 412. The hexagonal shape provides the flexibility of design for a densely packed array, e.g., arrays 414-416, and the parametric shape enables computational design that can be easily scaled and modified while maintaining the basic shape of the hexagon. In this example, the dimensions of the shapes are geometrically similar and their relationship is proportionally maintained.

As illustrated, the sides of the hexagonal loop 410 are designated by reference letter "a" and the sides of the hexagonal patch 412 are designated by reference letter "b". The hexagonal patch 412 is centered within the hexagonal loop 410. Corresponding points on the perimeters of the loop and patch are equidistant from each other, specifically in this example, at a distance designated by "d". This configuration is repeated to form a densely packed lattice. FIG. 5 illustrates examples of scaling of various hexagonal metastructure cells, and their positioning within lattices 500-508. There is a large variety of hexagonal shapes and configurations that may be implemented, both symmetric and asymmetric. Note also that although illustrated as having a hexagonal shape, a metastructure cell may be of another shape, e.g., circular, rectangular, etc., depending on the application. A variety of sizes, configurations and designs may be implemented.

Figure 6:
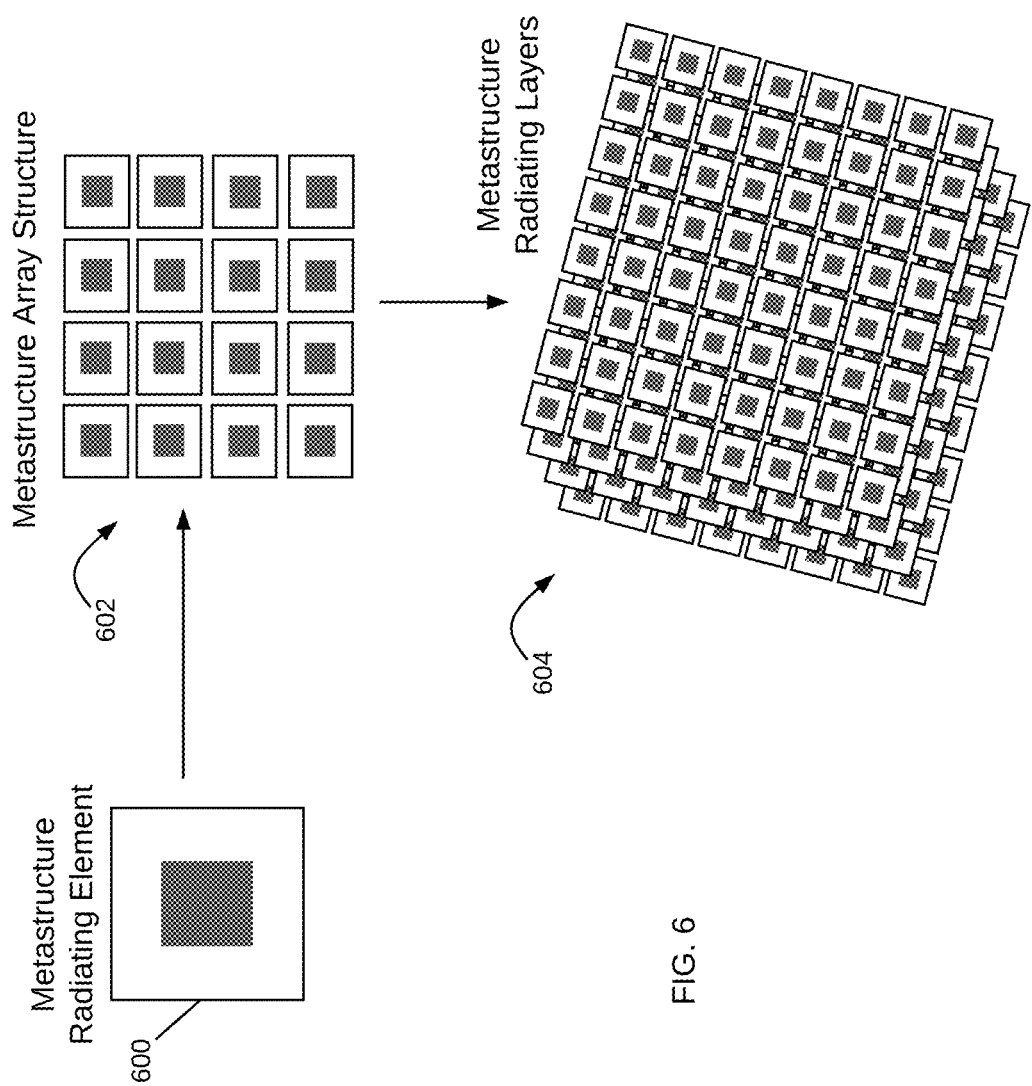
FIG. 6 is a schematic diagram of a metastructure cell, a single layer metastructure array and a multi-layer metastructure array in accordance with various examples.

In FIG. 6, a metastructure cell 600 is shown to have a rectangular shape. The metastructure cell 600 can be arranged in a metastructure array structure 602 as in the metastructure array of cells 306 in FIG. 3. Note that in structure 602, the metastructure cells are spaced apart by a distance that is determined based on the desired radiation pattern and beam characteristics. Note also that a metastructure antenna may be implemented as a layer in a multi-layer radiating array, such as metastructure radiating layers 604 having 4 layers of 8×8 radiating arrays. The number of cells in an array, the shape of the cells, the spacing between the cells, and the number of layers can all be designed to achieve a desired performance, with subarrays configured to generate beams at a given direction and phase.

Figure 7:
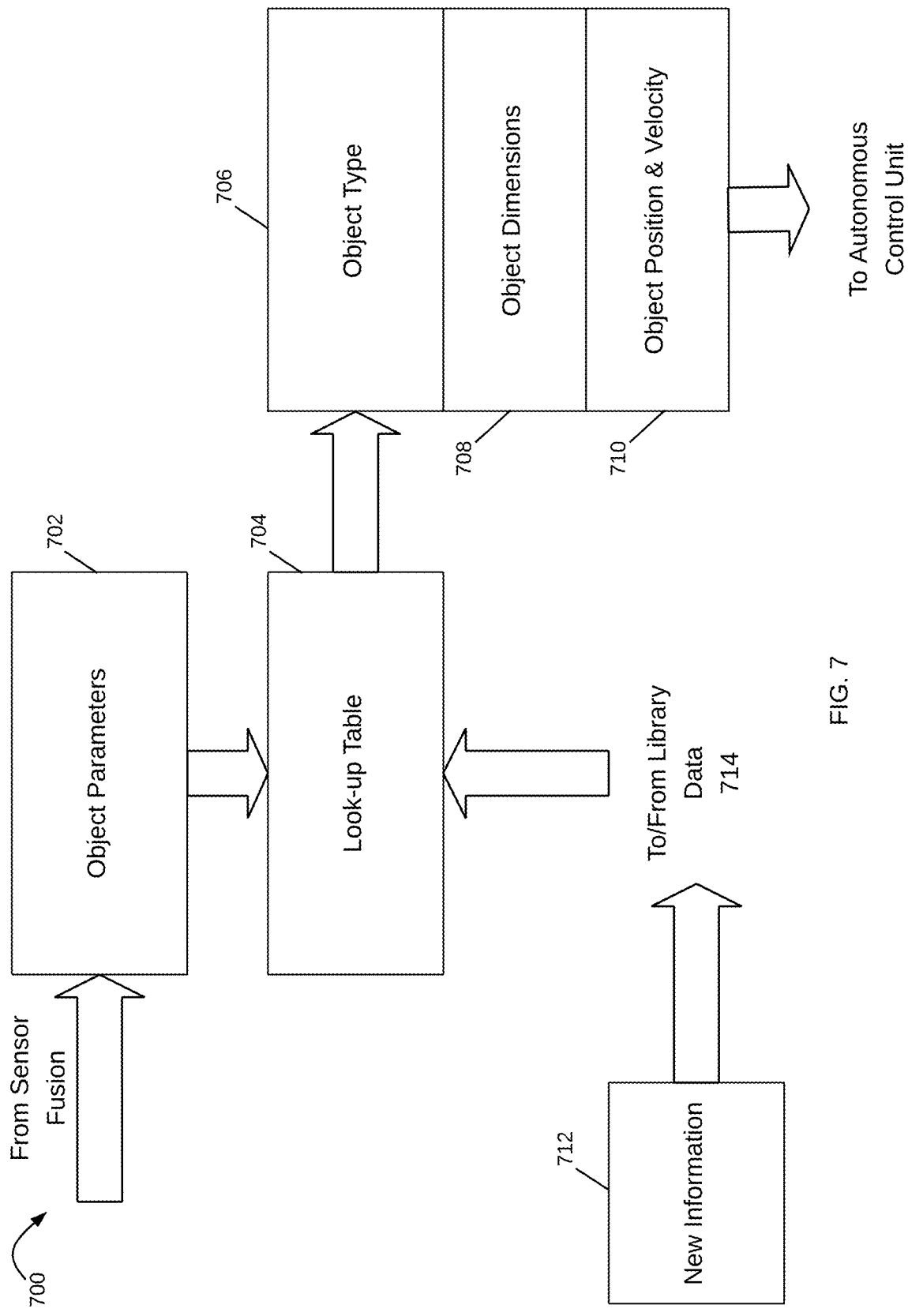
FIG. 7 illustrates operation of a sensor fusion module in accordance with various examples.

Attention is now directed to FIG. 7, which illustrates operation of a sensor fusion system in accordance with various examples. Sensor fusion system 700 receives information and data from each of the various sensors in the vehicle, e.g., radar detection unit 104, camera detection unit 106 and lidar detection unit 108 of FIG. 1. In various examples described herein, the radar detection unit has a metastructure antenna (e.g., metastructure antenna 204 of FIG. 2) to beamform directed signals and provide information much faster than when incorporating digital beamforming. Note that some examples may include both metastructure-based beamforming and digital beamforming depending on the application and design of a vehicle; however, in the present examples, digital beamforming is replaced with the more flexible and low-latency metastructure-based beamforming.

Sensor fusion system 700 receives the information from the vehicle's sensors and uses the information to determine if an object is detected. This may be a signal provided by the radar detection unit 104, which may include a variety of information including location of the object with respect to the vehicle and/or velocity of the object with respect to the vehicle. Once the sensor fusion system 700 detects an object, the next step is to identify the object. Object parameters 702 include the different parameters and information provided to the sensor fusion system 700. This information may be raw data, which is processed by analysis within the sensor fusion system 700, or may be specific data that was analyzed by each vehicle sensor. As illustrated, object parameters 702 are mapped to values in look up table 704 to determine an object type 706, object dimensions 708, and an object position and velocity 710. This information is then provided to an autonomous control unit that interfaces with the vehicle. When new information 712 that may be used to identify a detected object from parameters is received, this information is stored in the library data 714, and is stored in look up table 704. The look up table 704 is an example of a mapping technique, but there may be other methods, including the use of an ASIC device which improves the speed of reaction and information flow in the sensor fusion module 700.

Figure 8:
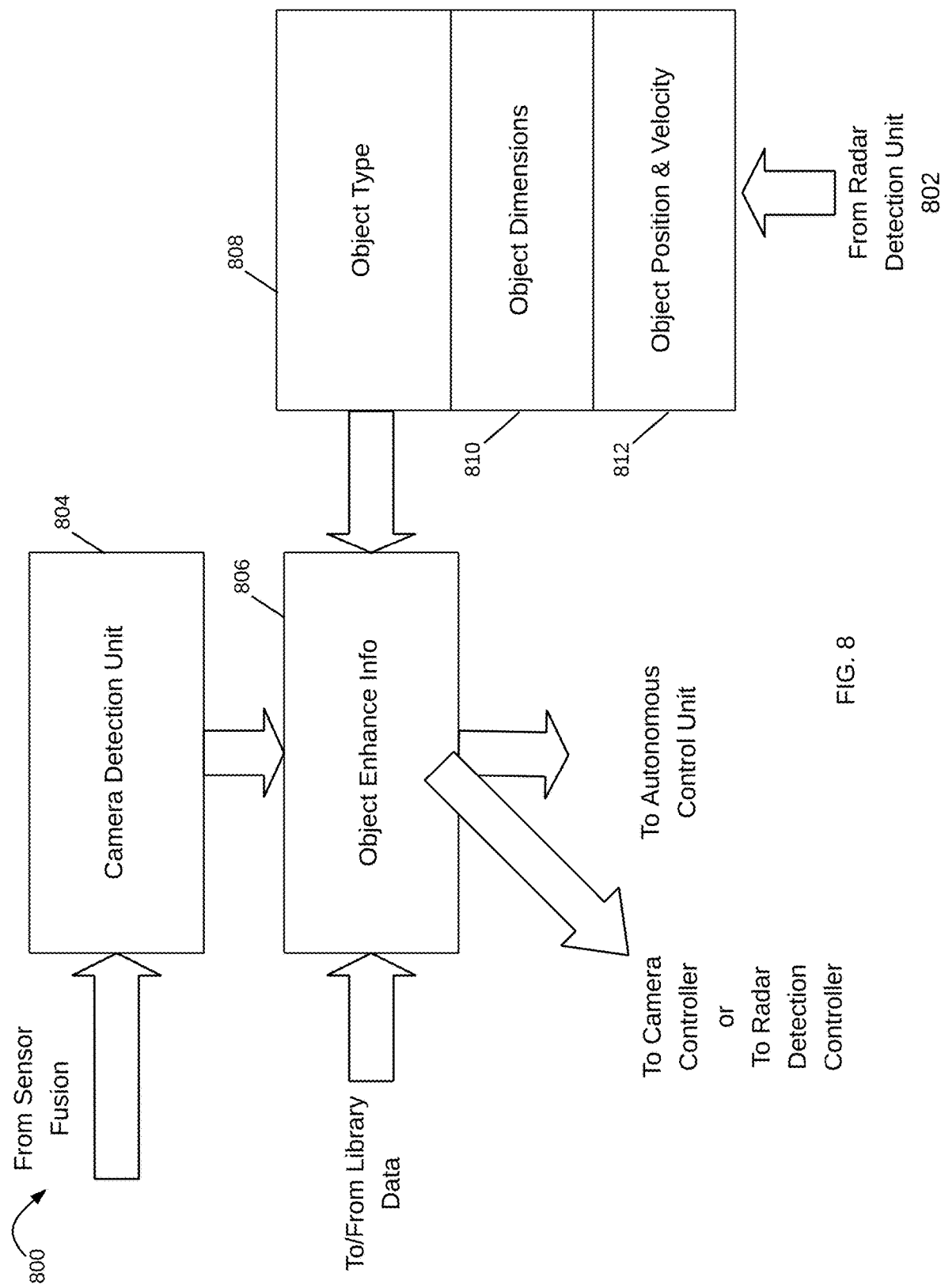
FIG. 8 illustrates operation of a sensor fusion module in multi-sensor control in accordance with various examples.

FIG. 8 illustrates operation of a sensor fusion system in multi-sensor control. In this example, information from the radar detection unit 802 and camera detection unit 804 is used for control of each other in sensor fusion system 800. Information from the camera detection unit 804 is provided to object enhance information module 806. The radar detection unit 802 provides information to determine the object type 808, the object dimensions 810, and the object position and velocity 812. The detections are provided to object enhance information module 806. This combined information is then provided to an autonomous control unit for vehicle controls. The information is also shared with the controllers of the camera detection unit 804 and the radar detection unit 802 so as to optimize the advantages of each. The camera detection unit 804 assists the sensor fusion system 800 to understand the specifics of an object beyond the parameters provided by the radar detection unit 802.

Figure 9:
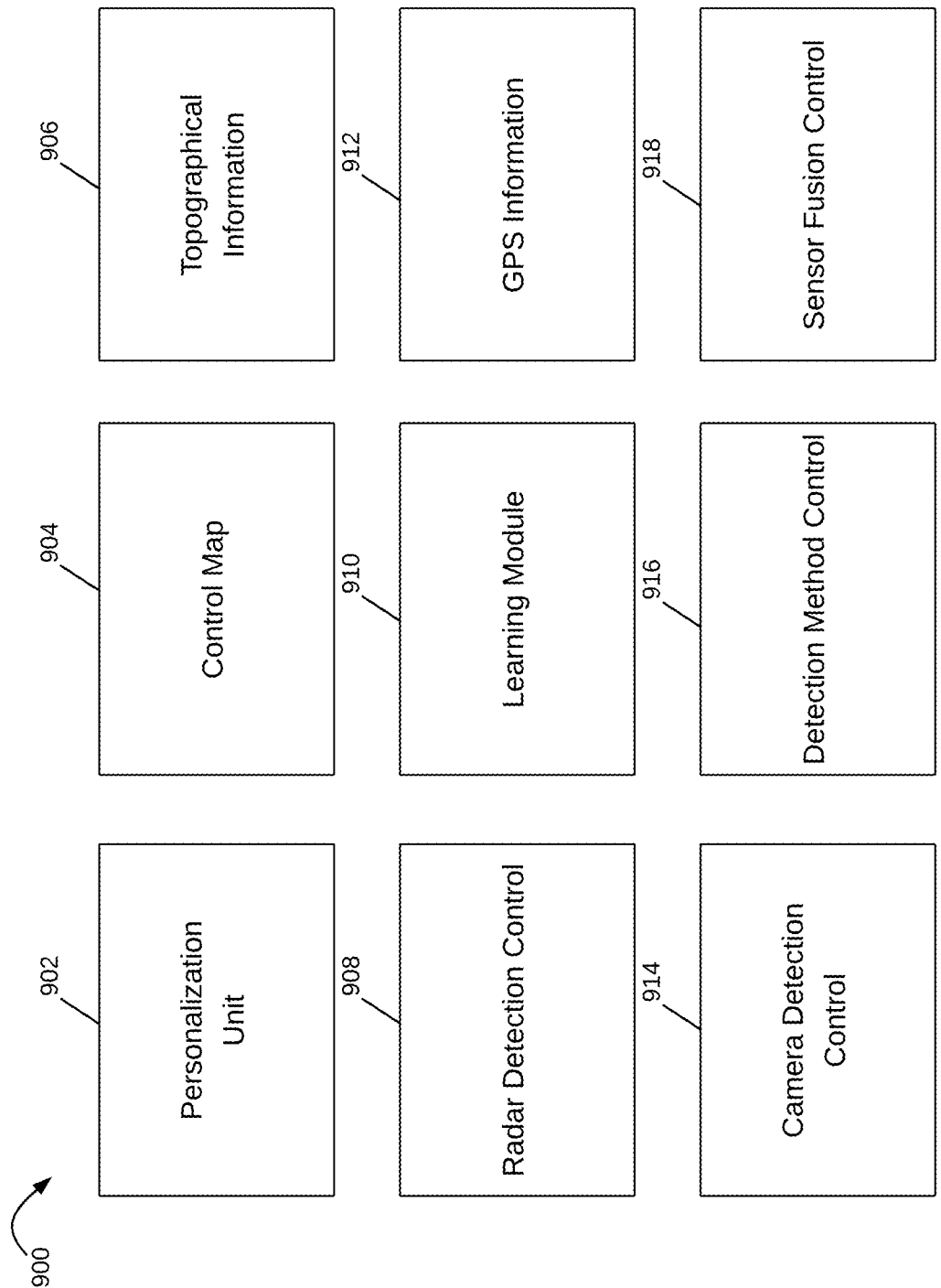
FIG. 9 is a schematic diagram of a sensor fusion module in accordance with various examples.

FIG. 9 is a schematic diagram of a sensor fusion system in accordance with various examples. Sensor fusion system 900 includes personalization unit 902, which enables modification of sensor fusion system 900 according to rules and decisions specific to the vehicle or application. Various vehicle control modules in the vehicle can apply the personalized rules to adjust the controls and actions taken. For example, one vehicle may rely on lidar for objects in the blind spot of a vehicle and next to a vehicle, where another vehicle may rely on camera data or radar data for this information. In another example, the controls may give differing weights to the various sensors, such as to give more significance to radar data at night or in bad weather. There are many differentiations that vehicle manufacturers may desire, including the ability to modify settings, rules and controls in sensor fusion system 900.

Other units illustrated in FIG. 9 control various sensors, such as radar detection control 908 and camera detection control 914. Additional units are used to access information from a variety of sources, including those external to the vehicle, such as GPS information 912 and topographical information 906. Control map 904 is used to determine the types of maps available and uses this information to enhance object identification. By understanding the environment, maps are able to provide information as to stationary structures and give some certainty and reference to the vehicle controls. This information enables sensor fusion system 900 to not only select object detection methods in detection method control 916 but also to interpret the received information. In various examples, map information is compared to detected objects and parameters to facilitate vehicle control actions. This information is also available for training the radar detection control 908 in learning module 910, such as a neural network, for making control decisions. As the vehicle is used and reacts to the environment, the resultant data provides data sets for training the radar detection control 908.

The topographical information 906 may be compiled within memory in sensor fusion module 900, or may be retrieved as needed from a central or cloud-based repository. Topographical information 906 may, for example, provide elevation information and be accessed at multiple resolutions as desired. This information forms a collection of map information that is derived from elevation and is applicable to multiple controls of the vehicle, such as slope in degrees, slope in percent, aspect, contours, features, hillshade, and so forth. Elevation data may be used to create profiles of an area, or profiles of a path taken often by the vehicle. The data also provides analysis of danger areas, such as roads that are subject to flooding, wherein such data may be combined with weather reports to anticipate alternate paths, or initiate different rules and sensors so that the vehicle will detect dangerous situations. The sensor fusion system 900 may use the map information to identify residual features, which may be stored in memory, and dynamic features that change with time, such as due to erosion, landslide, flood, and so forth. The dynamic features may be used to predict potholes and other obstacles that may form in a roadway. This information enables the sensor fusion system 900 as to which modules to initiate in specific locations and situations and how to adjust its sensor fusion control 918 to changing environmental conditions experienced by the vehicle.

Figure 10:
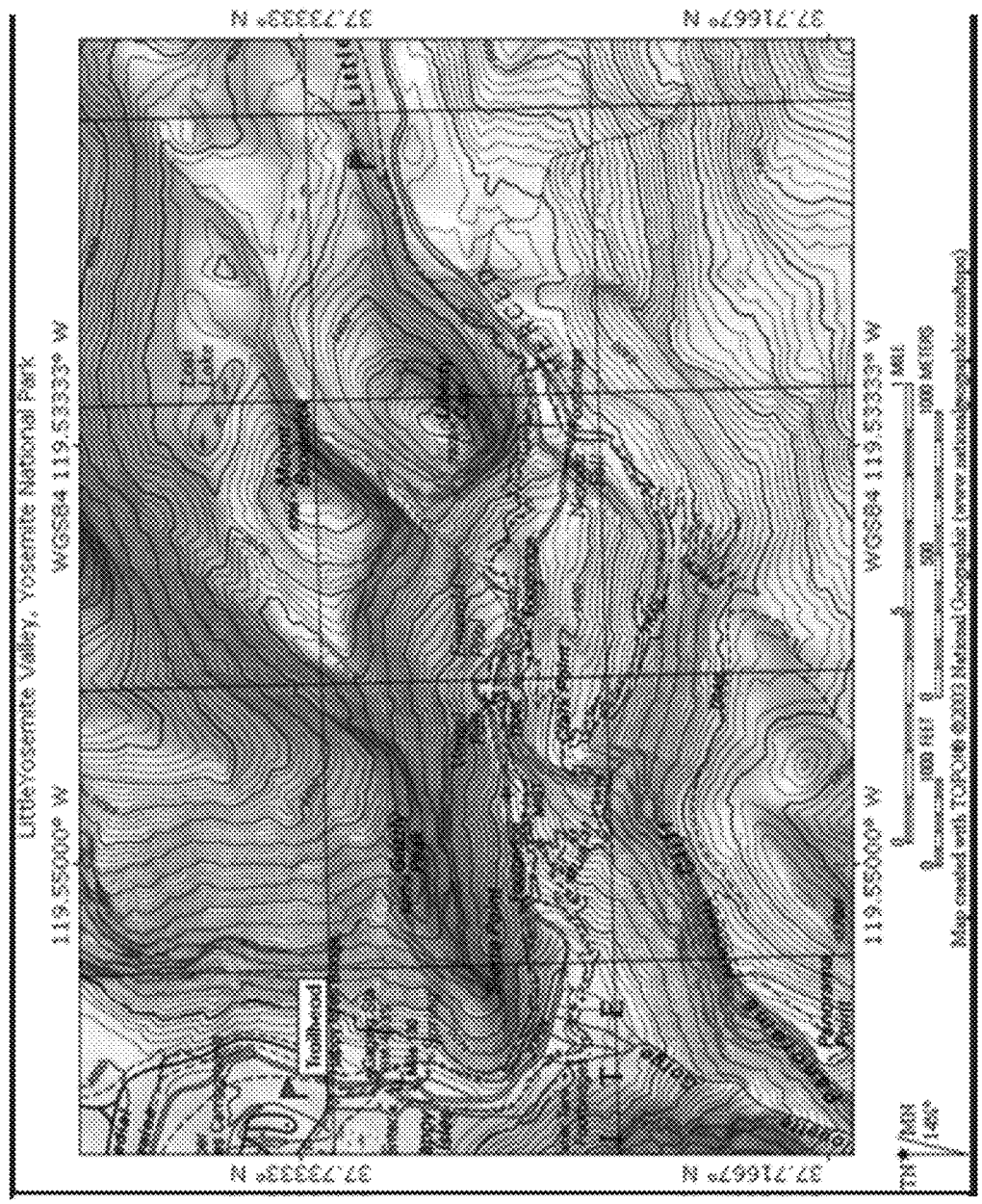
FIGS. 10-12 illustrate topographical maps having associated data used in a sensor fusion module implemented as in FIG. 1 in accordance with various examples.
Figure 11:
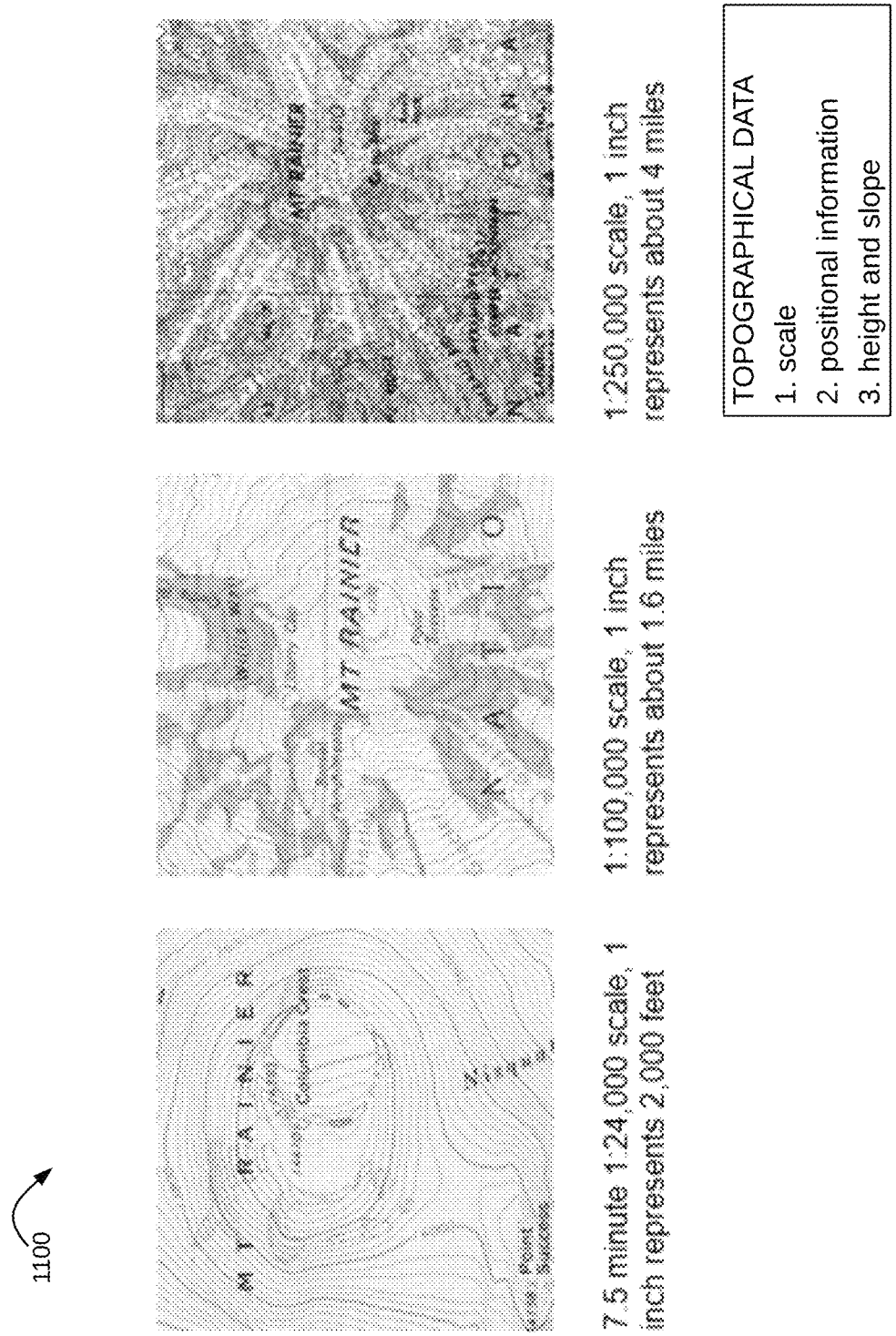
Figure 12:

One of the key applications for this information is in the adjustment of the beamform from the radar detection unit. FIGS. 10-12 illustrate different maps, including topographical maps 1000 and 1100 of FIGS. 10 and 11 respectively, and the aerial view map 1200 of FIG. 12. The topographical maps are determined based on measurements of height, slope and so forth. They are provided in graphic form for ease of understanding. In the sensor fusion system 900, the data and measurements are used to determine the change in elevation of a roadway, such as when the vehicle encounters a hill or steep incline or decline. The aerial map 1200 of FIG. 12 may be used for comparative purposes with respect to the camera readings. The aerial map 1200 may also be provided in digital form, such that the data may be used in a manner similar to that of the topographical map data of maps 1000 and 1100. In various examples, this map information is used for sensor control as well as confirmation of the identification process, such as where the topographical map information indicates a flat surface, but one of the other maps indicates an incline. The sensor fusion system 900 may then adjust the speed of the vehicle in anticipation, or may initiate another sensor to detect the change in elevation, or may place a higher weight on one type of sensor.

Figure 13:
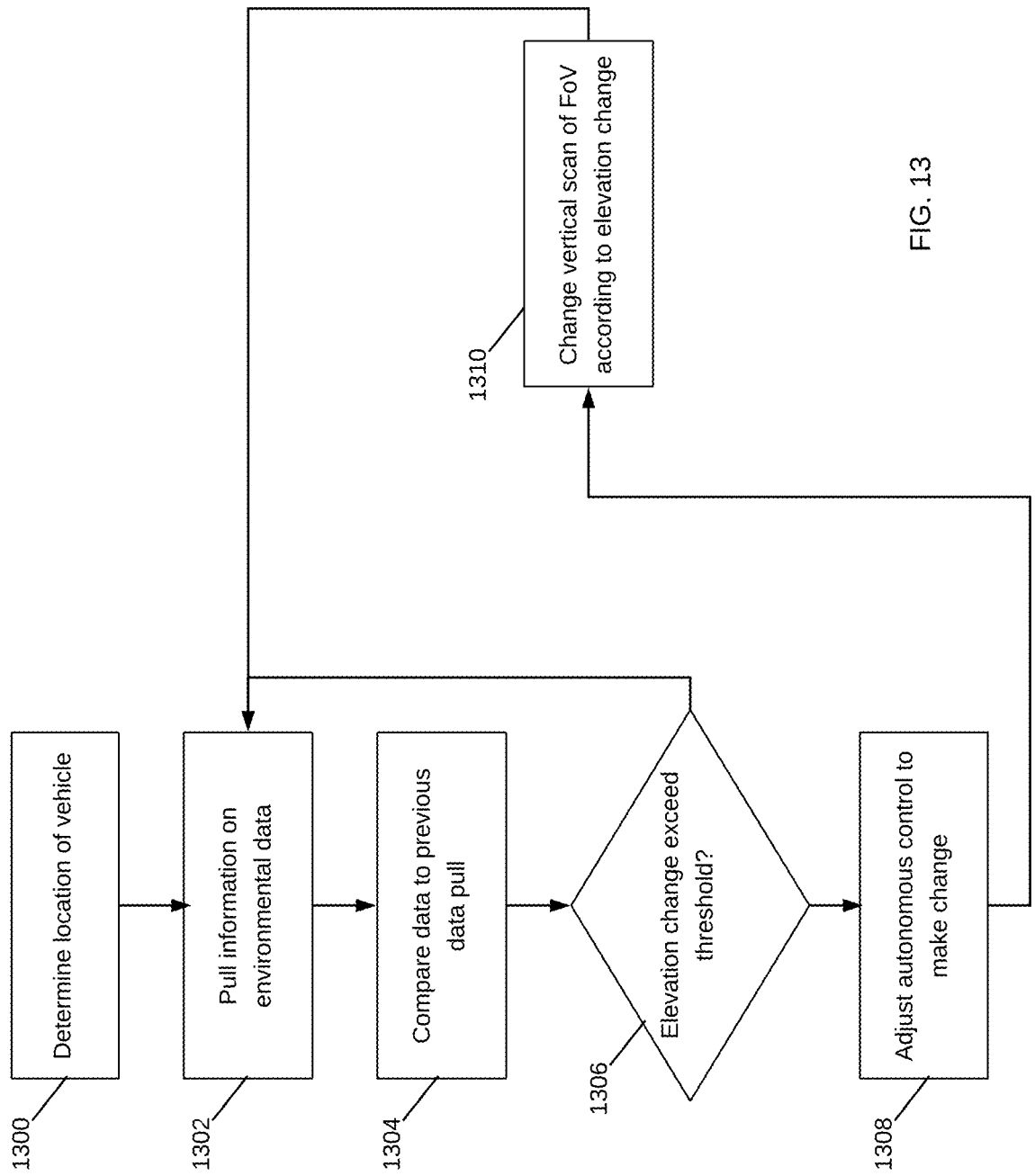
FIG. 13 is a flowchart for applying environmental information in a sensor fusion module in accordance with various examples.

Attention is now directed to FIG. 13, which illustrates a flowchart for applying environmental information in a sensor fusion system in accordance with various examples. First, the sensors in the vehicle, e.g., the radar detection unit 104, the camera detection unit 106 and the lidar detection unit 108, determine the location of the vehicle (1300). The sensor fusion system then pulls environmental data from internal databases, external databases, and/or sensor information (1302). The environmental data is compared to previously pulled environmental data (1304) to identify changes in the environmental conditions. If there is a change in elevation (1306), the system adjusts autonomous control and sensors to manage the change (1308). In this process loop, the system is checking the elevation data to determine whether to make any adjustments to the angle of the metastructure antenna in the radar detection unit 104. If there is an increase in slope coming up, the vertical range of the metastructure antenna needs to change (1310) so that the antenna is scanning up the slope. If there is no change, the process returns to step 1302.

In various examples, the radar detection unit 104 generates an omnidirectional beam in the forward direction. The metastructure antenna in the radar detection unit 104 (e.g., metastructure antenna 204 of FIG. 2) may scan up to 360° in the azimuth, or horizontal, direction, and similarly in the vertical direction. A typical vehicle may incorporate an antenna having a horizontal 180° scan range centered on the normal to the plane of the front of the vehicle, and having a 50° vertical scan range to scan from the ground level. This scan is an omnidirectional wide beam that scans the path of the vehicle and areas into which objects may enter.

In various examples, in response to detection of an object in the path of the vehicle, the metastructure antenna transitions to a pencil beam scan, or a narrow and focused beam, to detect additional information about the object. Once the object is detected, the narrow beam is generated to take additional measurements of the object to determine if it is stationary or moving, reflective or non-reflective, dimensions and other parameters that may be determined from the radar detection unit 104. Similarly, when multiple objects are detected by the radar detection unit 104, the sensor fusion system 100 determines the type of object for identification. In the case where a detected object is a street sign providing information to the vehicle, that information is pulled by the sensors, such as where the camera reads the speed limit and applies this to operation of the vehicle. In some situations, the traffic sign may have wireless capability to communicate with the vehicle, and then a communication ensues. Identification may be performed by raster scanning of an object to determine a set of parameters. These parameters are then compared to a library of images, including known objects. The library of images may include bus shapes, human forms of different sizes, rocks and other obstacles that may fall into a roadway, other vehicles and specific shapes. The library of images are compiled with their corresponding parameters. New images may be added as they are determined, which may be specific to an area or path.

In another example, the beamform from the metastructure antenna may be narrowed to a width sufficient to enable identification of objects in the path and surrounding environment of the vehicle. Topographical information of the environment may indicate that there is no elevation change in the path of the vehicle. The map information may include information from weather services, crowd sourced information, and other notifications and information available at the time of travel and may indicate that there are road conditions, such as the road is slippery, or a lane is closed ahead, and so forth.

In various examples, sensor fusion system 100 also evaluates the location and movement of each identified object. An object that may be close to the vehicle, such as a pedestrian, may be moving slowly. The sensor fusion system 100 determines that it may monitor the pedestrian less often than a moving vehicle which may be more distant than the pedestrian. The radar detection unit adjusts the beamform of its metastructure antenna according to each of the detected objects.

Figure 14:
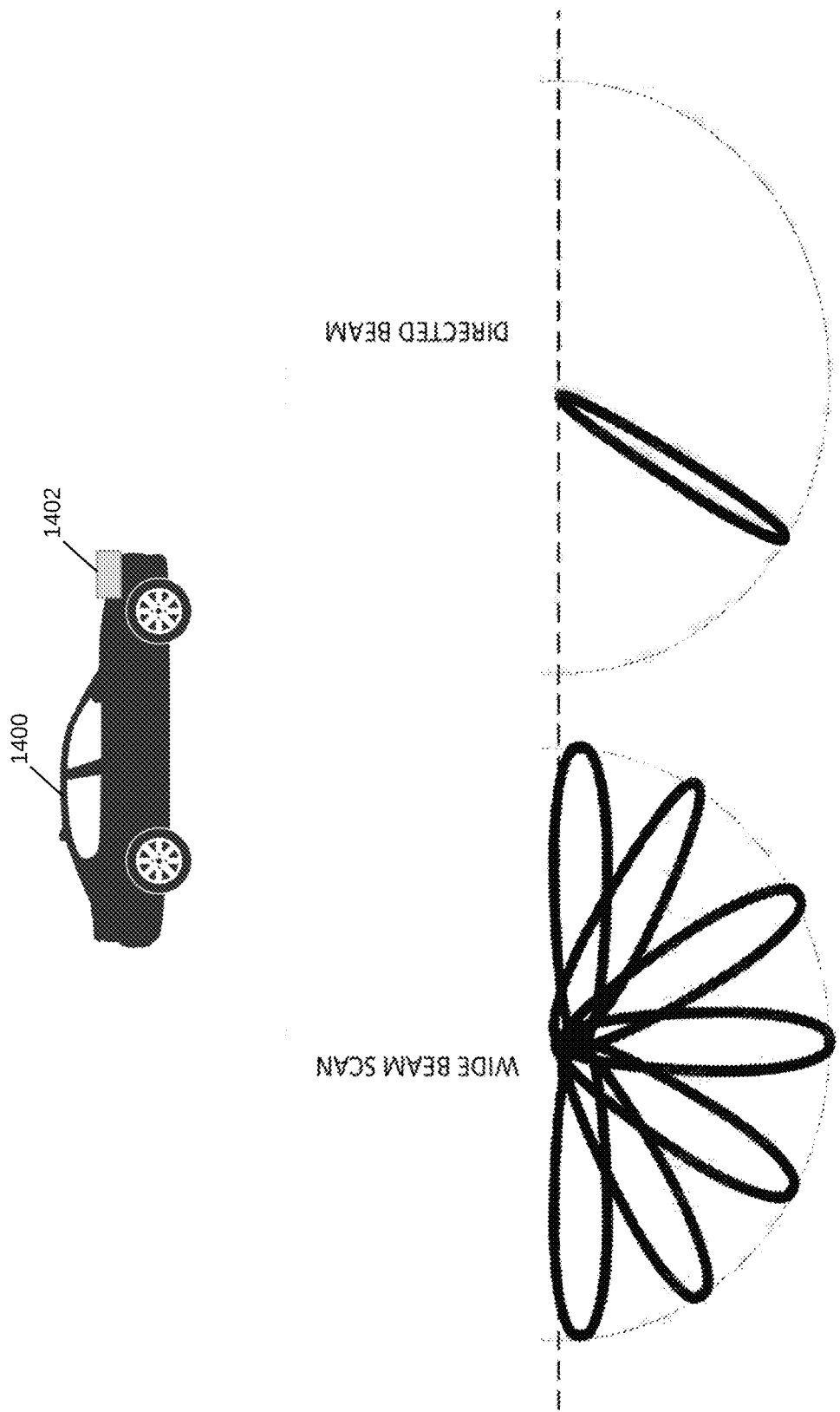
FIG. 14 illustrates the scan range of wide beams and directed beams of a radar detection unit as in FIG. 1 and in accordance with various examples.

FIG. 14 illustrates the scan range of wide beams and directed beams. From the front of vehicle 1400 with radar detection unit 1402, the scan ranges are measured with respect to a plane of the front of the vehicle. The metastructure antenna in radar detection unit 1402 is adjusted to achieve the various beam scan and beamforms. As described above with reference to FIG. 2, this is performed by direct voltage control of the metastructure cells in the metastructure antenna, thereby avoiding digital processing associated with other methods of control.

Figure 15:
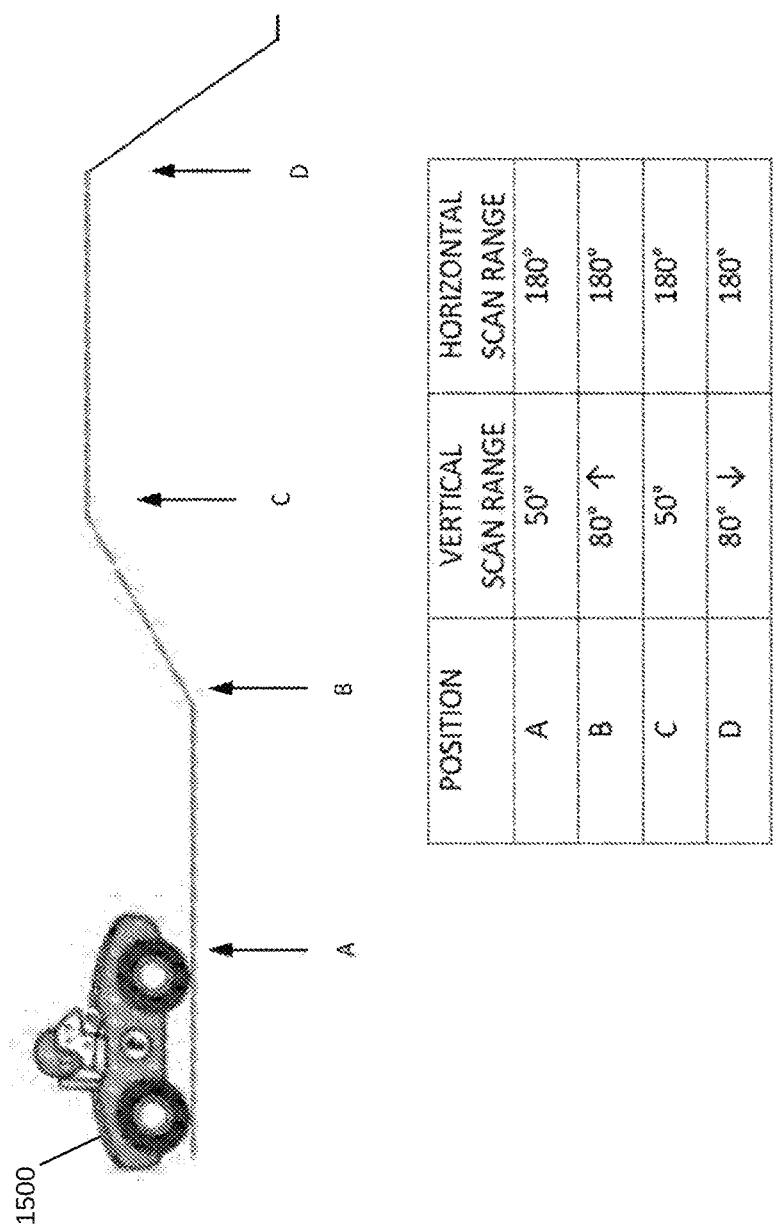
FIG. 15 illustrates operation of a sensor fusion system in response to topographical information in accordance with various examples.

FIG. 15 illustrates operation of a sensor fusion system in response to topographical information. As vehicle 1500 travels, the topographical information enables the sensor fusion system (not shown) in the vehicle to adjust the beamform of the radar detection unit to adjust to the changing conditions. As illustrated, when the vehicle 1500 will go up an incline, the vertical range is increased in a positive direction, while decreased for declines. When an echo is received by the radar detection unit, it is able to extract the FoV parameters and this includes echoes and information indicating that objects are detected. When there are no received echoes, the radar detection unit continues to transmit beams and listen for echoes. The FoV parameters may include the range from the system to the detected object, the speed of the object, the size of the object and so forth, in addition to the direction of arrival of the signals reflected by the object.

In various examples, an antenna controller narrows the focus of the transmitted, or radiated, beamforms and then checks to see if the adjustment is sufficient. The adjustment may require some additional feedback, or may be done in one or more steps. The beam is focused to capture more information about the detected object. The sensor fusion and antenna controller evaluate the FoV to identify where the object is detected. For example, the detected object may be on the right-hand side of the vehicle, at road level and so forth. The antenna controller then configures a subarray or subarrays of the metastructure cells in the metastructure antenna to correspond to the position of the detected object in the FoV. The narrowed beam is transmitted over a desired portion of the FoV. In some examples, the radar detection unit is able to identify a silhouette of the detected object; this may be used to differentiate a car from a bus, a person from a vehicle, and so forth. Additionally, the radar detection may involve a comparison of travel parameters of the detected object with respect to the vehicle so as to identify an anticipated future location of the object with respect to the vehicle. The speed and velocity of the detected object enable intelligent control and adjustment of the drive path. This is enhanced when the antenna controller determines an object type from the silhouette data and the travel parameters. From some or all of this information, the antenna controller provides information to the vehicle controller, which makes a decision as to how to react.

In some examples, radar detection process interfaces with a variety of other systems within an application. For example, in a vehicular application, information received at the antenna and the analysis of at least a portion of that data is provided to other modules for processing, such as to perception layers in an automobile or to a navigation screen. The specific shape of the antenna, the number of metastructure cells, the arrangement of the metastructure cells and the proximity of the feed structure are specific to the application. The specific shape of the metastructure cells may take on any of variety of shapes that result in the desired characteristics and behavior of the metastructure antenna, and are not restricted to square or rectangular or any other regular shape. The metastructure cell is designed to accomplish a range of radiation patterns based on the number of degrees of freedom as reflected in the edges and corners of the shape.

Each of the metastructure cells of the antenna structure may operate individually or as part of a subarray. The antenna controller may control groups of metastructure cells, or subarrays. The antenna controller determines where the radiated beam is to be directed, the shape of the beam and the dimensions of the beam. The beam may be a coarse or large bandwidth beam, a midsized beam or a small, narrow bandwidth depending on the situation, the object detected and the timing of the detection, as well as other considerations. The antenna controller may preconfigure one or more of the subarrays to anticipate a next action, or may use a default configuration, such as to start with a broad bandwidth which enables a faster scan capability, or sweep time. For each sweep, the FoV is divided into portions, which may have consistent dimensions, different dimensions or may be dynamically adjusted. In some examples, the antenna controller selects specific directions to have a narrow beam, such as directly in front of the vehicle; other directions, such as the edges of the FoV, may be scanned with a wide beam. These and other design considerations are made by the designer in setting up the antenna configuration, wherein flexibility may be built into the antenna structure.

The present disclosure provides methods and apparatus to incorporate environmental information and data for control of the radar antenna. The environmental information includes topographical information to detect an upcoming change in elevation and enable the radar detection unit to scan the appropriate area to detect objects in the path of the vehicle. This may be used in autonomous vehicles, including vehicles that have a sensor fusion system such as sensor fusion system 100 of FIG. 1 to assist the driver and those that are fully autonomous. The present disclosure provides a method and apparatus for sensor fusion to incorporate the environmental information into sensor control and object detection and identification. The sensor fusion receives, or has access to, the information detected by the multiple sensors in the vehicle. The sensor fusion uses this information to determine the area for the radar detection unit to scan. The metastructure antenna in the radar detection unit receives control information to respond to environmental information so that it changes the beam scanning scope, the form of the beam and the direction of the beam. This includes the horizontal scope, the vertical scope and the method of scanning. The metastructure antenna is configured to generate omnidirectional scans, wide and narrow scans, and adjust the efficiency of the scans. The metastructure antenna is also configured to receive back echoes on detection of an object.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A sensor fusion system for use in an autonomous vehicle, comprising:
   a radar detection unit comprising a metastructure antenna configured to direct a beamform in a field-of-view ("FoV") of the vehicle;
   an analysis module configured to receive information about a detected object and determine a plurality of control actions based on the received information and environmental information for the radar detection unit and the metastructure antenna, wherein the analysis module is a neural network that predicts a condition using the received information and environmental information; and
   an autonomous control unit configured to control one or more actions of the vehicle based on the received information and the environmental information and at a direction of the analysis module.

2. The sensor fusion system of claim 1, further comprising a camera detection unit and a lidar detection unit.

3. The sensor fusion system of claim 1, wherein one of the plurality of control actions includes directing the radar detection unit to change a width of the beamform and direct it toward the detected object and the one or more actions of the vehicle controlled by the autonomous control unit at the direction of the analysis module includes changing lanes.

4. The sensor fusion system of claim 1, further comprising a library that stores the environmental information, object detection information and object detection rules.

5. The sensor fusion system of claim 1, wherein the metastructure antenna comprises a plurality of subarrays of metastructure cells configured to radiate the beamform.

6. The sensor fusion system of claim 5, wherein at least one of the metastructure cells comprises a reactance control mechanism.

7. The sensor fusion system of claim 6, wherein the reactance control mechanism is a varactor coupled between a conductive area and a conductive loop in the at least one metastructure cell.

8. The sensor fusion system of claim 7, wherein the radar detection unit comprises a subarray controller configured to control a voltage applied to the varactor to change the beamform.

9. The sensor fusion system of claim 1, wherein the environmental information comprises topographical information and the analysis module is configured to direct the metastructure antenna to change a vertical range in response to a change in elevation in the topographical information.

10. The sensor fusion system of claim 1, further comprising a learning module configured to train the neural network.

11. A metastructure antenna system for use in a radar detection unit in an autonomous vehicle, comprising:
    an antenna feed configured to receive a transmission signal and distribute the transmission signal to a plurality of transmission lines in a transmission array;
    a metastructure antenna comprising a plurality of subarrays of metastructure cells configured to radiate the transmission signal into a beamform that enables a detection of an object in a field-of-view of the autonomous vehicle;
    a subarray controller configured to control a plurality of subarrays of the metastructure antenna to radiate the transmission signal based on the detected object and environmental information surrounding the detected object; and
    an analysis module comprising a neural network that receives information of the detected object and the environmental information and predicts a condition based on the information of the detected object and the environmental information, wherein the analysis module applies rules for controlling the plurality of subarrays of the metastructure antenna via the subarray controller based on the information of the detected object.

12. The metastructure antenna system of claim 11, wherein at least one of the metastructure cells comprises a varactor coupled between a conductive area and a conductive loop in the at least one metastructure cell.

13. The metastructure antenna system of claim 11, wherein the subarray controller is configured to apply a voltage to at least one metastructure cell in a subarray to change a direction of the beamform.

14. The metastructure antenna system of claim 11, wherein the plurality of subarrays are arranged in layers.

15. The metastructure antenna system of claim 11, wherein the metastructure cells are metamaterial cells organized in a lattice.

16. The metastructure antenna system of claim 11, wherein the environmental information comprises topographical information and the subarray controller is configured to direct the metastructure antenna to change a vertical range in response to a change in elevation in the topographical information.

17. A method to detect an object in a field-of-view of an autonomous vehicle, comprising:
- determining a location of the vehicle;
- gathering environmental information in a path and surrounding environment of the vehicle;
- comparing the environmental information to previous environmental data;
- detecting an elevation change;
- directing, via an analysis module, a metastructure antenna based on detected elevation change, wherein the analysis module comprises a neural network; and
- changing a vertical scan of the metastructure antenna in the vehicle.

18. The method of claim 17, wherein the environmental information comprises topographical information.

19. The method of claim 17, wherein changing the vertical scan of the metastructure antenna comprises changing a voltage applied to at least one cell of the metastructure antenna to change a reactance of the at least one cell.

20. The method of claim 17, wherein changing the vertical scan of the metastructure antenna comprises changing a voltage applied to a plurality of metastructure cells in at least one subarray of the metastructure antenna.

* * * * *